(12) United States Patent
Ramesh (10) Patent No.: US 7,366,475 B2
(45) Date of Patent: Apr. 29, 2008

(54) SIGNAL STRENGTH MEASUREMENTS IN CELLULAR TELECOMMUNICATION SYSTEMS

(75) Inventor: Rajaram Ramesh, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 738 days.

(21) Appl. No.: 10/861,987

(22) Filed: Jun. 4, 2004

(65) Prior Publication Data

US 2005/0272375 A1 Dec. 8, 2005

(51) Int. Cl.
*H04B 17/00* (2006.01)

(52) U.S. Cl. ................. 455/67.13; 455/67.11; 455/436; 455/437; 455/452.1; 455/452.2; 455/450; 455/226.1; 455/226.2; 455/226.3; 455/423; 455/425; 455/63.1; 455/296; 370/292; 370/331; 370/332; 370/289; 375/231; 375/346; 375/349

(58) Field of Classification Search ........ 455/423–425, 455/436–451, 452.1–2, 453–455, 500–502, 455/63.1–2, 67.11–16, 67.7, 296, 68–70, 455/550.1, 561, 90.1–2, 114.1–2, 115.1–4, 455/161.1–3, 226.1–4; 370/252–253, 328–333, 370/335–338, 277–278, 286–292, 431, 441–442, 370/461–465, 437, 503, 509–510, 512, 514; 375/229–236, 340–343, 346–349, 150, 152, 375/285

See application file for complete search history.

(56) References Cited

U.S. PATENT DOCUMENTS

| | | | |
|---|---|---|---|
| 6,018,661 A * | 1/2000 | Raith et al. .............. | 455/437 |
| 6,084,862 A * | 7/2000 | Bjork et al. ............. | 370/292 |
| 6,490,452 B1 | 12/2002 | Boscovic et al. | |
| 6,529,708 B1 * | 3/2003 | Larsson et al. .......... | 455/67.16 |
| 6,711,393 B1 * | 3/2004 | Stenstrom et al. ........ | 455/284 |
| 6,714,609 B1 * | 3/2004 | Keisala .................... | 375/349 |
| 6,845,238 B1 | 1/2005 | Muller | |
| 7,088,699 B1 * | 8/2006 | Hottinen et al. ......... | 370/342 |

(Continued)

FOREIGN PATENT DOCUMENTS

EP    1370099 A2    12/2003

(Continued)

OTHER PUBLICATIONS

Stephen Craig, et al; "Efficient Broadcast Frequency Utilization—A Key to High Capacity Cellular Networks", date unknown.

*Primary Examiner*—Tuan A. Tran (57) ABSTRACT

A mobile station (MS) and method for estimating received signal strength of a radio signal from a neighboring cell in a cellular radio telecommunication network. The MS measures the received signal strength of the radio signal over a plurality of frames, and calculates an average received signal strength. During an idle frame, the MS receives a synchronization channel (SCH) signal, and determines a channel estimate for the SCH using a known extended training sequence. The extended training sequence is then modified with the channel estimate, and the modified extended training sequence is subtracted from the received SCH signal to obtain a residual signal. The MS calculates a residual energy of the residual signal, and subtracts the residual energy from the average received signal strength of the radio signal to obtain an estimated received signal strength of the radio signal from the neighboring cell.

22 Claims, 4 Drawing Sheets

U.S. PATENT DOCUMENTS

| | | | |
|---|---|---|---|
| 7,088,978 B2 * | 8/2006 | Hui et al. | 455/296 |
| 7,145,957 B1 * | 12/2006 | Balz et al. | 375/261 |
| 2004/0002334 A1 | 1/2004 | Lee et al. | |
| 2004/0152478 A1 | 8/2004 | Ruohonen et al. | |

FOREIGN PATENT DOCUMENTS

| | | |
|---|---|---|
| WO | WO0119114 A1 | 3/2001 |
| WO | WO03071303 A1 | 8/2003 |

* cited by examiner

SIGNAL STRENGTH MEASUREMENTS IN CELLULAR TELECOMMUNICATION SYSTEMS

BACKGROUND

The present invention relates to radio telecommunication systems. More particularly, and not by way of limitation, the present invention is directed to a method of measuring signal strengths of signals from neighboring cells in a cellular radio telecommunication system.

In a cellular radio telecommunication system such as the Global System for Mobile Communications (GSM), each active mobile station (MS) operating within the coverage area of a given cell measures the signal strength of the traffic channel on which the mobile station is operating, together with the signal strengths of the control channels of neighboring cells. These signal strength measurements are reported to the system, which uses them to make handover and reselection decisions. However, the measurements currently made by MSs in GSM networks lack accuracy, and therefore lead to less than optimum handovers and erroneous target cell identification.

A method to improve the accuracy of neighbor cell RSSI measurements has been suggested in a paper by S. Craig, C. Jansson, Y. Timner, and T. Tynderfeldt entitled, "Efficient Broadcast Frequency Utilization—A Key to High Capacity Cellular Networks", VTC, Fall 2003 ("the Craig paper"). The Craig paper describes a method that uses channel estimation during neighbor cell measurements to isolate the signal strength of the neighbor cell, thereby improving the accuracy of the measurement. However, a problem with this method is that the neighbor cell measurement has to be done at a specific time, corresponding to when the training sequence of the neighbor cell occurs. In a synchronized system, the appropriate time can be easily determined to a fair degree of accuracy, but this is more difficult in an unsynchronized system. There may also be problems if the MS is operating in a high multislot mode (for example, DTM 3+2). A high multislot mode is a mode in which the MS receives and transmits multiple slots, thereby having less time to make an RSSI measurement on a neighboring cell. Thus, when operating in a high multislot mode, the switching requirements on the MS's synthesizer may preclude making the neighbor cell measurement on the training sequence without breaks in transmission or reception.

SUMMARY

In one aspect, the present invention is directed to a method of estimating received signal strength of a radio signal from a neighboring cell in a cellular radio telecommunication network. The method includes the steps of measuring the received signal strength of the radio signal over a plurality of frames; calculating an average received signal strength over the plurality of frames; receiving a synchronization channel signal during an idle frame; and determining a channel estimate for the synchronization channel using a known extended training sequence. The method also includes modifying the extended training sequence with the channel estimate, and subtracting the modified extended training sequence from the received synchronization channel signal to obtain a residual signal. The energy of the residual signal is then calculated. This is referred to as the residual energy. The method then subtracts the residual energy from the average received signal strength of the radio signal to obtain an estimated received signal strength of the radio signal from the neighboring cell.

In another aspect, the present invention is directed to a method of estimating received signal strength of a radio signal from a neighboring cell in a cellular radio telecommunication network. The method includes the steps of measuring the received signal strength of the radio signal over a plurality of frames; calculating an average received signal strength over the plurality of frames; receiving a synchronization channel signal during an idle frame; and determining a channel estimate for the synchronization channel using a known extended training sequence. The method also includes modifying the extended training sequence with the channel estimate; and subtracting the modified extended training sequence from the received synchronization channel signal to obtain a residual signal. The method then calculates a residual energy of the residual signal, and calculates a signal component energy on the synchronization channel by determining the energy of the modified extended training sequence. The method then determines whether the average received signal strength minus the residual energy is greater than or equal to the signal component energy plus a predefined threshold value. Upon determining that the average received signal strength minus the residual energy is greater than or equal to the signal component energy plus the predefined threshold value, the average received signal strength minus the residual energy is utilized as the estimated received signal strength of the radio signal from the neighboring cell. Upon determining that the average received signal strength minus the residual energy is less than the signal component energy plus the predefined threshold value, the signal component energy is utilized as the estimated received signal strength of the radio signal from the neighboring cell.

In yet another aspect, the present invention is directed to a mobile station for estimating received signal strength of a radio signal from a neighboring cell in a cellular radio telecommunication network. The mobile station includes means for measuring the received signal strength of the radio signal over a plurality of frames; means for calculating an average received signal strength over the plurality of frames; means for receiving a synchronization channel signal during an idle frame; and means for determining a channel estimate for the synchronization channel using a known extended training sequence. The mobile station also includes means for modifying the extended training sequence with the channel estimate; means for subtracting the modified extended training sequence from the received synchronization channel signal to obtain a residual signal; and means for calculating a residual energy of the residual signal. The mobile station then subtracts the residual energy of the residual signal from the average received signal strength of the radio signal to obtain an estimated received signal strength of the radio signal from the neighboring cell.

In still yet another aspect, the present invention is directed to a mobile station for estimating received signal strength of a radio signal from a neighboring cell in a cellular radio telecommunication network. The mobile station includes means for measuring the received signal strength of the radio signal over a plurality of frames; means for calculating an average received signal strength over the plurality of frames; means for receiving a synchronization channel signal during an idle frame; and means for determining a channel estimate for the synchronization channel using a known extended training sequence. The mobile station also includes means for modifying the extended training sequence with the channel estimate; and means for subtracting the modified extended training sequence from the received synchronization channel signal to obtain a residual signal. The mobile station also includes means for calculating a residual energy of the residual signal; and means for calculating a signal component energy on the synchronization channel by determining the energy of the modified extended training sequence. The mobile station then determines whether the average received signal strength minus the residual energy is greater than or equal to the signal component energy plus a predefined threshold value. Responsive to a determination that the average received signal strength minus the residual energy is greater than or equal to the signal component energy plus the predefined threshold value, the mobile station utilizes the average received signal strength minus the residual energy as the estimated received signal strength of the radio signal from the neighboring cell. Responsive to a determination that the average received signal strength minus the residual energy is less than the signal component energy plus the predefined threshold value, the mobile station utilizes the signal component energy as the estimated received signal strength of the radio signal from the neighboring cell.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

In accordance with the teachings of the present invention, an MS operating within the coverage area of a given cell measures the neighbor cell Received Signal Strength Indication (RSSI) each frame at an appropriate time. Each cell in the network broadcasts a synchronization channel (SCH) that provides a cell ID and information on the timing used in the cell. During the candidate identification phase, when the MS attempts to decode the SCH, the MS calculates the signal strength of the residual signal, which corresponds to the interference component of the signal strength. The residual is subtracted from the measured signal strength that has been averaged over several frames to give a better overall estimate of the neighbor cell signal strength. If a large number of co-channel signals are present, this single measurement of interference signal strength will not have a significant bias. In isolated cases, it is possible that the residual calculated on the SCH will have greater signal strength than the averaged RSSI. In this case, the difference (Averaged RSSI−residual) is compared to the strength of the signal component that can be calculated on the SCH, and the measured signal component strength on the SCH is used instead of the difference value if the ratio is less than a predefined threshold level. The use of this threshold can lower the variance of the measurement error.

Figure 1:
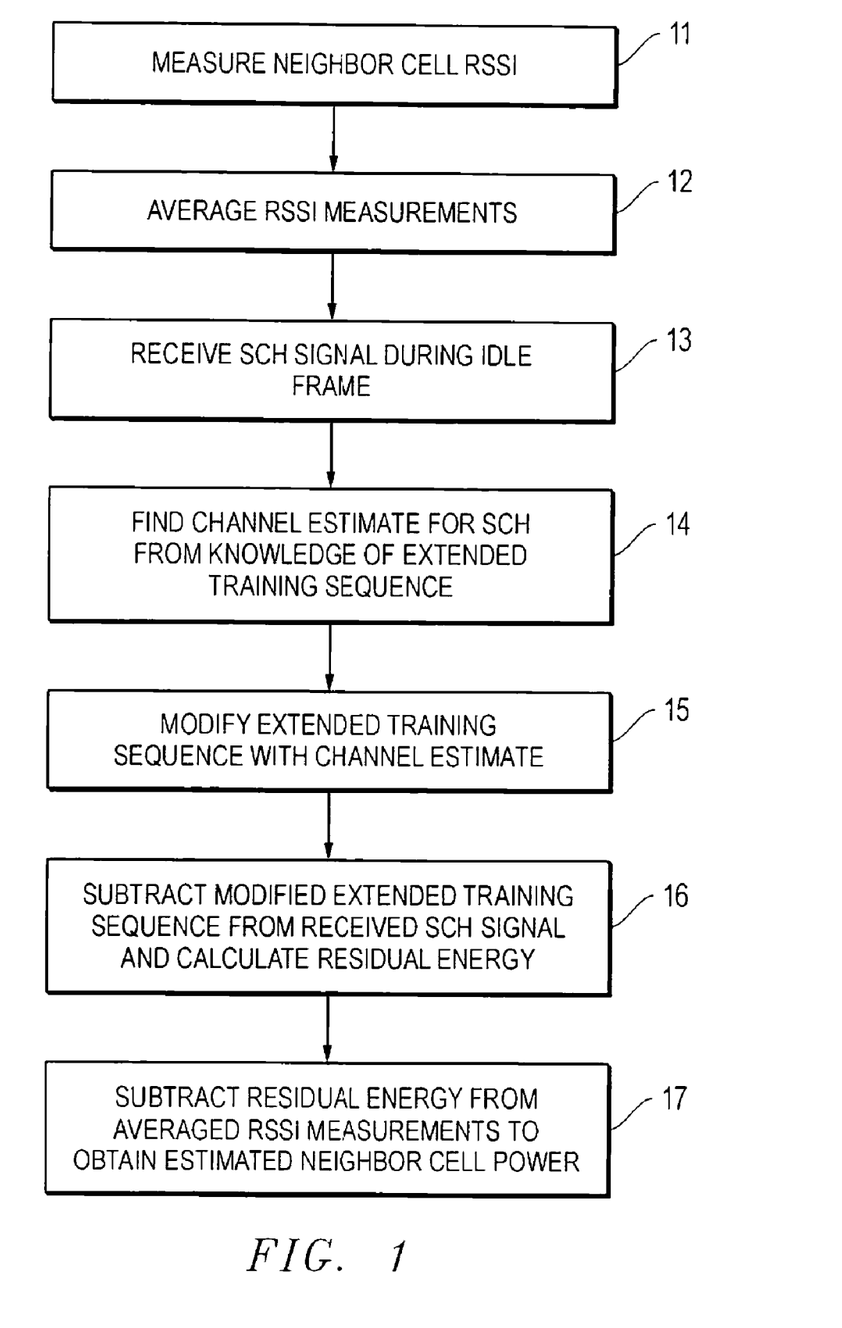
FIG. 1 is a flow chart illustrating the steps of a first exemplary embodiment of the method of the present invention.

FIG. 1 is a flow chart illustrating the steps of a first exemplary embodiment of the invention. At step 11, the MS makes RSSI measurements on the candidate neighbor cell Broadcast Control Channel (BCCH) Absolute Radio Frequency Channel Number (ARFCN) during normal frames. At step 12, the RSSI measurements are averaged over several frames for the ARFCN. At step 13, the MS receives the SCH signal on the candidate neighbor cell ARFCN during an idle frame. The SCH has a 64-bit training sequence in the middle of the burst. The training sequence is used for bit-level synchronization to the SCH (for example, by correlating to the extended training sequence), and estimating the channel coefficients. The MS knows the extended training sequence. This is a fixed sequence according to the GSM specifications and is the same in all cells.

At step 14, the MS finds the channel estimate for the SCH from knowledge of the 64-bit extended training sequence. The received signal can be written as $r(n)=c(0) \cdot s(n)+c(1) \cdot s(n-1)+c(2) \cdot s(n-2)+\ldots+$noise. The channel estimation procedure finds estimates of the coefficients $c(k)$, given that $s(n), s(n-1), \ldots$, which correspond to the extended training sequence, are known. At step 15, the MS modifies the extended training sequence with the channel estimate. This is actually a convolution of the extended training sequence and the sequence of channel coefficients. At step 16, the MS subtracts the extended training sequence, as modified by the channel estimate, from the received SCH signal to obtain a residual sequence, and calculates the energy of this sequence for different values of n. At step 17, the MS subtracts the residual energy from the averaged RSSI measurements to obtain the estimated neighbor cell power.

Figure 2:
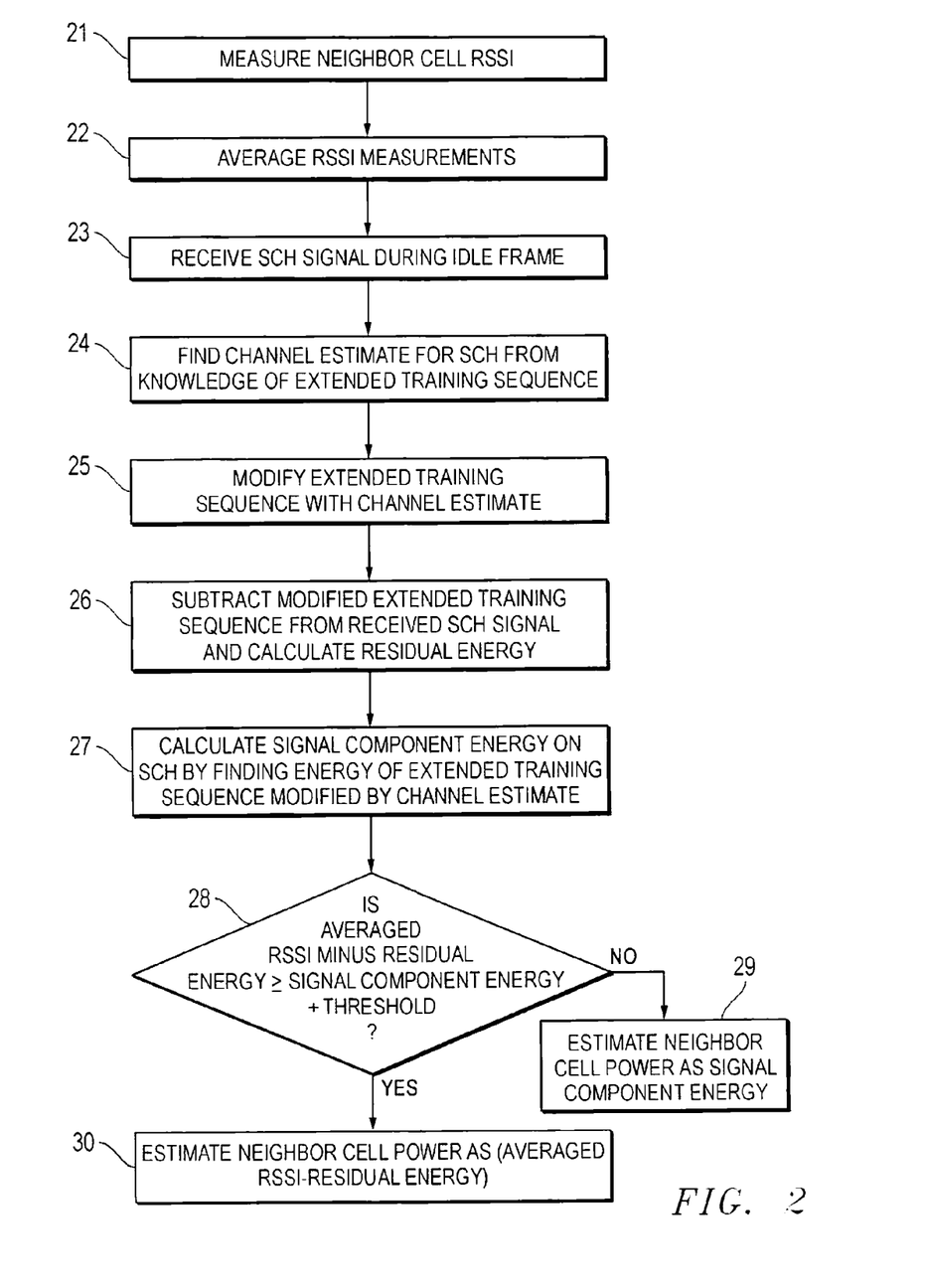
FIG. 2 is a flow chart illustrating the steps of a second exemplary embodiment of the method of the present invention.

FIG. 2 is a flow chart illustrating the steps of a second exemplary embodiment of the invention. In the second embodiment, a threshold is used to refine the estimate in case of bad measurements. In general, the signal component energy varies across bursts, and therefore should be averaged. In the second embodiment, some additional steps are performed to ensure that the reported result is reasonable. At step 21, the MS makes RSSI measurements on the candidate neighbor cell BCCH ARFCN during normal frames. At step 22, the RSSI measurements are averaged over several frames for the ARFCN. At step 23, the MS receives the SCH signal on the candidate neighbor cell ARFCN during an idle frame. At step 24, the MS finds the channel estimate for the SCH from knowledge of the 64-bit extended training sequence. At step 25, the MS modifies the extended training sequence with the channel estimate. At step 26, the MS subtracts the extended training sequence, as modified by the channel estimate, from the received SCH signal and calculates the residual energy. At step 27, the MS calculates the signal component energy on the SCH by finding the energy of the extended training sequence modified by the channel estimate.

At step 28, it is determined whether the averaged RSSI calculated at step 22 minus the residual energy calculated at step 26 is greater than or equal to the signal component energy calculated at step 27 plus a predefined threshold signal level. If not, the neighbor cell power is estimated as the signal component energy. However, if averaged RSSI−residual energy$\geq$signal component energy+threshold, the neighbor cell power is estimated as averaged RSSI−residual energy.

The method of the present invention is applicable to both synchronized and unsynchronized networks. Although the results of the invention may be less accurate than the method described in the Craig paper discussed above, the invention does not require the MS to make signal strength measurements at a specific time. Compared to currently implemented handover methods, the invention improves handover and reselection accuracy while requiring only minor modifications to the MS implementation.

Figure 3:
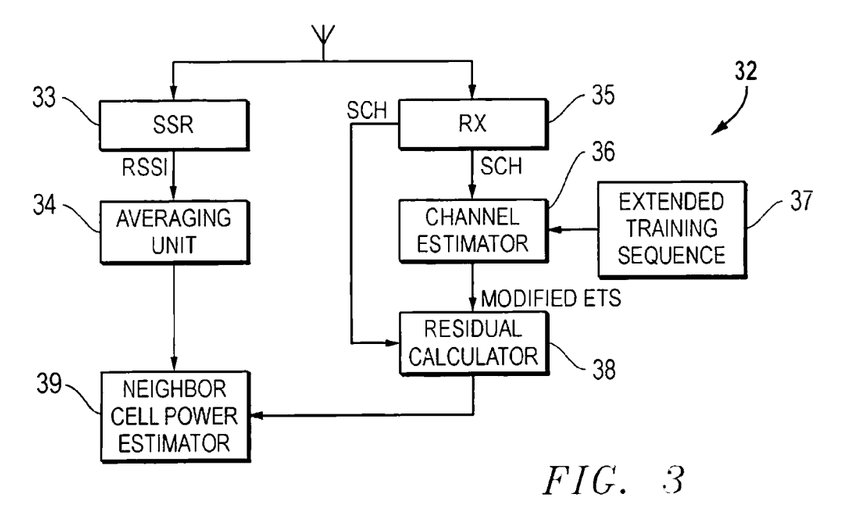
FIG. 3 is a simplified functional block diagram of a neighbor cell power estimation function implemented within a mobile station in accordance with the first embodiment of the present invention.

FIG. 3 is a simplified functional block diagram of a neighbor cell power estimation function 32 implemented within a mobile station in accordance with the first embodiment of the present invention. A signal strength receiver (SSR) 33 makes RSSI measurements on the candidate neighbor cell BCCH ARFCN during normal frames and supplies the measurements to an averaging unit 34, which averages the RSSI measurements over several frames for the ARFCN. During an idle frame, the MS's receiver 35 receives the SCH signal on the candidate neighbor cell ARFCN. The SCH is supplied to a channel estimator 36, which uses knowledge of the 64-bit extended training sequence 37 to find the channel estimate for the SCH. The channel estimator then supplies the extended training sequence, as modified by the channel estimate, to a residual calculator 38. The residual calculator subtracts the modified extended training sequence from the received SCH signal and calculates the residual energy. A neighbor cell power estimator 39 then subtracts the residual energy from the averaged RSSI measurements to obtain the estimated neighbor cell power.

Figure 4:
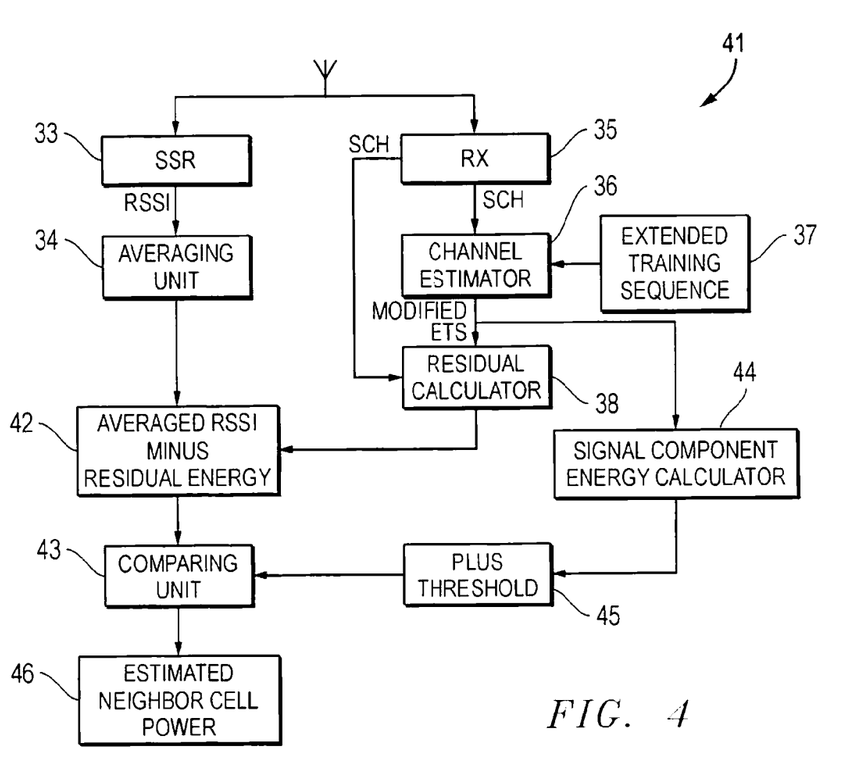
FIG. 4 is a simplified functional block diagram of a neighbor cell power estimation function implemented within a mobile station in accordance with the second embodiment of the present invention.

FIG. 4 is a simplified functional block diagram of a neighbor cell power estimation function 41 implemented within a mobile station in accordance with the second embodiment of the present invention. Like the first embodiment, the SSR 33 makes RSSI measurements on the candidate neighbor cell BCCH ARFCN during normal frames and supplies the measurements to the averaging unit 34, which averages the RSSI measurements over several frames for the ARFCN. The receiver 35 receives the SCH signal on the candidate neighbor cell ARFCN during an idle frame, and supplies the SCH to the channel estimator 36, which uses knowledge of the 64-bit extended training sequence 37 to find the channel estimate for the SCH. The channel estimator then supplies the extended training sequence, as modified by the channel estimate, to the residual calculator 38. The residual calculator subtracts the modified extended training sequence from the received SCH signal and calculates the residual energy. The residual energy is sent to a subtraction unit 42, which subtracts the residual energy from the averaged RSSI measurements, and supplies the result to a comparing unit 43.

The channel estimator 36 also sends the modified extended training sequence to a signal component energy calculator 44, which calculates the signal component energy on the SCH by finding the energy of the modified extended training sequence. An addition unit 45 then adds a predefined threshold value to the signal component energy, and sends the result to the comparing unit 43. If the comparing unit determines that the value received from the subtraction unit 42 is less than the value received from the addition unit 45, the signal component energy is used as the estimated neighbor cell power 46. If the comparing unit determines that the value received from the subtraction unit 42 is greater than or equal to the value received from the addition unit 45, the value received from the subtraction unit (averaged SSI−residual energy) is used as the estimated neighbor cell power 46.

Figure 5:
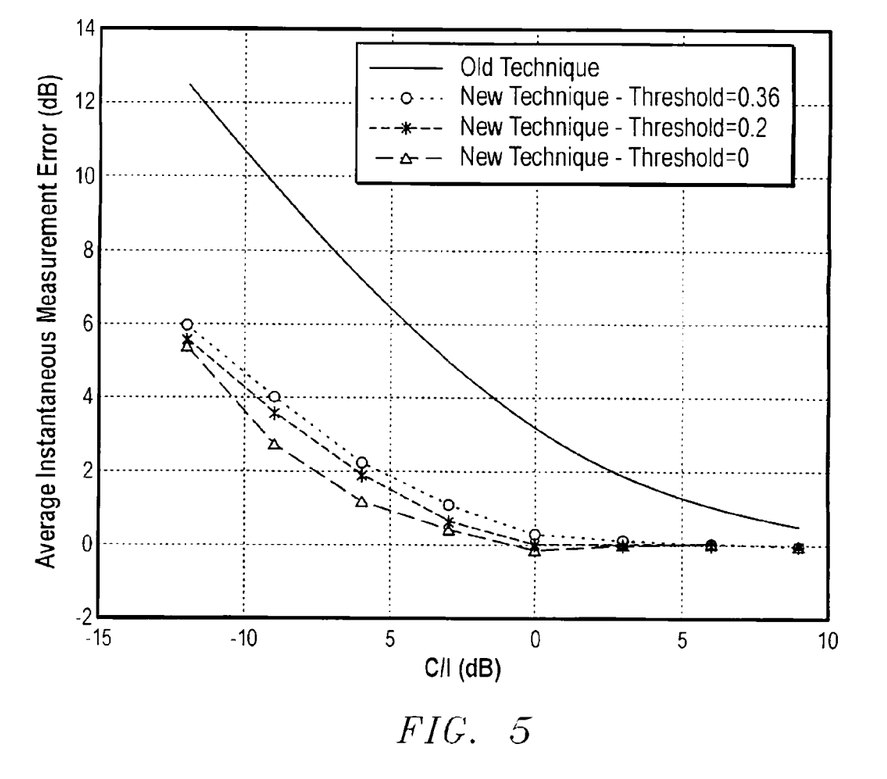
FIG. 5 is a graph of the performance of the present invention compared to the prior art measurement technique.

FIG. 5 is a graph of average instantaneous measurement error (dB) as a function of carrier-to-interference (C/I) ratio (dB) for the prior art (old) measurement technique together with the technique of the present invention (new) at three different threshold levels. The instantaneous measurement error is defined as the ratio of the measured RSSI (after averaging) and the actual averaged signal RSSI (genie-aided), measured in dBs. The mean value of the averaged instantaneous measurement error (over trials and profiles) is shown in FIG. 1 as a function of C/I. It is clearly seen that the present invention significantly improves the average instantaneous measurement error over the old method.

Although the present invention has been described as utilizing a channel estimate for a synchronization channel (SCH), other signals having known components can also be measured and utilized to perform the calculations described above, and to improve the estimates of neighbor cell power. An example of this is the frequency correction channel (FCH) in GSM. In the process of looking for the SCH of a neighbor cell, the MS first locates the FCH of that cell. The FCH provides the MS with information about the position (in time) of the SCH. The FCH is transmitted on a radio channel as a sine wave on a known frequency. When the MS receives it, the sine wave has been modified due to the radio channel. The MS then reconstructs the sine wave, taking into account the impact of the radio channel. The channel estimate can be estimated when the sine wave is received. This involves estimating the received sine wave's amplitude, phase, and frequency offset from the known frequency. The MS then subtracts the reconstructed sine wave from the received FCH signal, and the residual signal provides a measure of the residual energy. Alternatively, the MS may average the residual values from the FCH and the SCH.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of estimating received signal strength of a radio signal from a neighboring cell in a cellular radio telecommunication network, said method comprising the steps of:

measuring the received signal strength of the radio signal over a plurality of frames;

calculating an average received signal strength over the plurality of frames;

receiving a synchronization channel signal during an idle frame;

determining a channel estimate for the synchronization channel using a known extended training sequence;

modifying the extended training sequence with the channel estimate;

subtracting the modified extended training sequence from the received synchronization channel signal to obtain a residual signal;

calculating an energy level of the residual signal to obtain a residual energy; and subtracting the residual energy of the residual signal from the average received signal strength of the radio signal to obtain an estimated received signal strength of the radio signal from the neighboring cell.

2. The method of claim 1, wherein the method is performed by a mobile station operating in the cellular radio telecommunication network.

3. The method of claim 2, wherein the cellular radio telecommunication network is an unsynchronized Global System for Mobile Communications (GSM) network.

4. The method of claim 2, wherein the cellular radio telecommunication network is a synchronized Global System for Mobile Communications (GSM) network.

5. The method of claim 2, further comprising the steps of:
reporting the estimated received signal strength to the network, and
utilizing the estimated received signal strength by the network to determine whether to handover the mobile station to the neighboring cell.

6. A method of estimating received signal strength of a radio signal from a neighboring cell in a cellular radio telecommunication network, said method comprising the steps of:
measuring the received signal strength of the radio signal over a plurality of frames;
calculating an average received signal strength over the plurality of frames;
receiving a synchronization channel signal during an idle frame;
determining a channel estimate for the synchronization channel using a known extended training sequence;
modifying the extended training sequence with the channel estimate;
subtracting the modified extended training sequence from the received synchronization channel signal to obtain a residual signal;
calculating an energy level of the residual signal to obtain a residual energy;
calculating a signal component energy on the synchronization channel by determining the energy of the modified extended training sequence;
determining whether the average received signal strength minus the residual energy is greater than or equal to the signal component energy plus a predefined threshold value;
upon determining that the average received signal strength minus the residual energy is greater than or equal to the signal component energy plus the predefined threshold value, utilizing the average received signal strength minus the residual energy as the estimated received signal strength of the radio signal from the neighboring cell; and
upon determining that the average received signal strength minus the residual energy is less than the signal component energy plus the predefined threshold value, utilizing the signal component energy as the estimated received signal strength of the radio signal from the neighboring cell.

7. The method of claim 6, wherein the method is performed by a mobile station operating in the cellular radio telecommunication network.

8. The method of claim 7, wherein the cellular radio telecommunication network is an unsynchronized Global System for Mobile Communications (GSM) network.

9. The method of claim 7, wherein the cellular radio telecommunication network is a synchronized Global System for Mobile Communications (GSM) network.

10. The method of claim 7, further comprising the steps of:
reporting the estimated received signal strength to the network, and
utilizing the estimated received signal strength by the network to determine whether to handover the mobile station to the neighboring cell.

11. A mobile station for estimating received signal strength of a radio signal from a neighboring cell in a cellular radio telecommunication network, said mobile station comprising:
means for measuring the received signal strength of the radio signal over a plurality of frames;
means for calculating an average received signal strength over the plurality of frames;
means for receiving a synchronization channel signal during an idle frame;
means for determining a channel estimate for the synchronization channel using a known extended training sequence;
means for modifying the extended training sequence with the channel estimate;
means for subtracting the modified extended training sequence from the received synchronization channel signal to obtain a residual signal;
means for calculating an energy level of the residual signal to obtain a residual energy; and
means for subtracting the residual energy of the residual signal from the average received signal strength of the radio signal to obtain an estimated received signal strength of the radio signal from the neighboring cell.

12. The mobile station of claim 11, wherein the mobile station is adapted to operate in an unsynchronized Global System for Mobile Communications (GSM) network.

13. The mobile station of claim 11, wherein the mobile station is adapted to operate in a synchronized Global System for Mobile Communications (GSM) network.

14. The mobile station of claim 11, further comprising means for reporting the estimated received signal strength to the network for use in a handover algorithm.

15. A mobile station for estimating received signal strength of a radio signal from a neighboring cell in a cellular radio telecommunication network, said mobile station comprising:
means for measuring the received signal strength of the radio signal over a plurality of frames;
means for calculating an average received signal strength over the plurality of frames;
means for receiving a synchronization channel signal during an idle frame;
means for determining a channel estimate for the synchronization channel using a known extended training sequence;
means for modifying the extended training sequence with the channel estimate;
means for subtracting the modified extended training sequence from the received synchronization channel signal to obtain a residual signal;
means for calculating an energy level of the residual signal to obtain a residual energy;
means for calculating a signal component energy on the synchronization channel by determining the energy of the modified extended training sequence;
means for determining whether the average received signal strength minus the residual energy is greater than or equal to the signal component energy plus a predefined threshold value;
means responsive to a determination that the average received signal strength minus the residual energy is greater than or equal to the signal component energy plus the predefined threshold value, for utilizing the average received signal strength minus the residual energy as the estimated received signal strength of the radio signal from the neighboring cell; and means responsive to a determination that the average received signal strength minus the residual energy is less than the signal component energy plus the predefined threshold value, for utilizing the signal component energy as the estimated received signal strength of the radio signal from the neighboring cell.

16. The mobile station of claim 15, wherein the mobile station is adapted to operate in an unsynchronized Global System for Mobile Communications (GSM) network.

17. The mobile station of claim 15, wherein the mobile station is adapted to operate in a synchronized Global System for Mobile Communications (GSM) network.

18. The mobile station of claim 15, further comprising means for reporting the estimated received signal strength to the network for use in a handover algorithm.

19. A method of estimating received signal strength of a first radio signal from a neighboring cell in a cellular radio telecommunication network, said method comprising the steps of:
measuring the received signal strength of the first radio signal over a plurality of frames;
calculating an average received signal strength over the plurality of frames;
receiving on a radio channel, a second radio signal having a known component that has been modified by the radio channel;
determining what modifications have been made to the known component by the radio channel;
reconstructing the known component to account for the radio channel modifications;
subtracting the reconstructed component from the received second radio signal to obtain a residual signal;
calculating an energy level of the residual signal to obtain a residual energy; and
subtracting the residual energy from the average received signal strength of the first radio signal to obtain an estimated received signal strength of the first radio signal from the neighboring cell.

20. The method of claim 19, wherein the network is a Global System for Mobile Communications (GSM) network and the step of receiving a second radio signal having a known component includes receiving a frequency correction channel (FCH) having a known sine wave at a known frequency.

21. A method of estimating received signal strength of a first radio signal from a neighboring cell in a cellular radio telecommunication network, said method comprising the steps of:
measuring the received signal strength of the first radio signal over a plurality of frames;
calculating an average received signal strength over the plurality of frames;
receiving a timing signal on a frequency correction channel (FCH) transmitted on a radio channel, said timing signal having a known sine wave at a known frequency, wherein the sine wave is modified by the radio channel during transmission;
determining what modifications have been made to the known sine wave by the radio channel;
reconstructing the known sine wave to account for the modifications by the radio channel;
subtracting the reconstructed sine wave from the sine wave received on the FCH to obtain a residual signal;
calculating an energy level of the residual signal to obtain a residual energy; and
subtracting the residual energy from the average received signal strength of the first radio signal to obtain an estimated received signal strength of the first radio signal from the neighboring cell.

22. A method of estimating received signal strength of a first radio signal from a neighboring cell in a cellular radio telecommunication network, said method comprising the steps of:
calculating an average received signal strength of the first radio signal;
receiving a second radio signal on a frequency correction channel (FCH) transmitted on a radio channel, said second radio signal having a known sine wave at a known frequency, wherein the sine wave is modified by the radio channel during transmission;
calculating a residual energy associated with the FCH by performing the steps of:
determining what modifications have been made to the known sine wave by the radio channel;
reconstructing the known sine wave to account for the modifications by the radio channel;
subtracting the reconstructed sine wave from the sine wave received on the FCH to obtain an FCH residual signal; and
calculating an energy level of the FCH residual signal to obtain an FCH residual energy;
receiving a third radio signal on a synchronization channel (SCH), said third radio channel having a known extended training sequence;
calculating a residual energy associated with the SCH by performing the steps of:
determining a channel estimate for the synchronization channel using a known extended training sequence;
modifying the extended training sequence with the channel estimate;
subtracting the modified extended training sequence from the received synchronization channel signal to obtain an SCH residual signal; and
calculating an energy level of the SCH residual signal to obtain an SCH residual energy;
averaging the FCH residual energy and the SCH residual energy; and
subtracting the averaged residual energy from the average received signal strength of the first radio signal to obtain an estimated received signal strength of the first radio signal from the neighboring cell.

* * * * *